US011943258B2

(12) United States Patent
Wright et al.

(10) Patent No.: US 11,943,258 B2
(45) Date of Patent: Mar. 26, 2024

(54) MANAGING CLIENT-ORIENTED DOMAIN NAME SERVICE OVER HYPERTEXT TRANSFER PROTOCOL SECURE

(71) Applicant: Charter Communications Operating, LLC, St. Louis, MO (US)

(72) Inventors: Ethan J. Wright, Denver, CO (US); Matthew James Wright, Denver, CO (US); Wystan Schmidt, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 347 days.

(21) Appl. No.: 17/322,268

(22) Filed: May 17, 2021

(65) Prior Publication Data
US 2022/0368725 A1 Nov. 17, 2022

(51) Int. Cl.
*H04L 9/40* (2022.01)
*H04L 9/32* (2006.01)

(52) U.S. Cl.
CPC .......... *H04L 63/20* (2013.01); *H04L 9/3263* (2013.01); *H04L 63/166* (2013.01)

(58) Field of Classification Search
CPC ..... H04L 63/20; H04L 9/3263; H04L 63/166; H04L 63/0823; H04L 61/4511
See application file for complete search history.

(56) References Cited

U.S. PATENT DOCUMENTS

| 9,705,922 | B2 | 7/2017 | Foxhoven et al. |
| 10,225,237 | B2 | 3/2019 | Singh |
| 10,728,287 | B2 | 7/2020 | Foxhoven et al. |
| 2015/0143504 | A1* | 5/2015 | Desai ................. H04L 63/0245 709/224 |
| 2019/0068554 | A1* | 2/2019 | Austin ................ H04L 63/0263 |
| 2019/0306166 | A1* | 10/2019 | Konda ................ H04W 12/069 |
| 2020/0112619 | A1* | 4/2020 | Nikolic ................ G06F 16/957 |
| 2021/0136037 | A1* | 5/2021 | Balasubramaniam ..................... H04L 61/4511 |

(Continued)

FOREIGN PATENT DOCUMENTS

WO WO-2021014204 A1 * 1/2021

OTHER PUBLICATIONS

Casey Deccio and Jacob Davis. 2019. DNS privacy in practice and preparation. In Proceedings of the 15th International Conference on Emerging Networking Experiments And Technologies (CoNEXT '19). Association for Computing Machinery, New York, NY, USA, 138-143. (Year: 2019).*

(Continued)

*Primary Examiner* — Michael R Vaughan
(74) *Attorney, Agent, or Firm* — THE MARBURY LAW GROUP, PLLC

(57) ABSTRACT

Various embodiments include network computing devices and methods for managing Domain Name Service (DNS) over Hypertext Transfer Protocol Secure (DoH). A processor of a network computing device may receive from a client computing device a DoH request comprising a public certificate associated with a client identifier. The processor may generate a fingerprint of the public certificate. The processor may obtain a client-specific DoH policy based on an association between the fingerprint of the public certificate and the client-specific DoH policy. The processor may apply the DoH policy to the DoH request to formulate a response to the DoH request.

18 Claims, 6 Drawing Sheets

(56) References Cited

U.S. PATENT DOCUMENTS

| | | | |
|---|---|---|---|
| 2021/0266185 A1* | 8/2021 | Konda | H04L 61/4511 |
| 2022/0239696 A1* | 7/2022 | Konda | H04L 61/4511 |
| 2022/0321362 A1* | 10/2022 | Konda | H04L 9/0891 |
| 2022/0321528 A1* | 10/2022 | Konda | H04L 63/0209 |
| 2023/0007105 A1* | 1/2023 | Haddad | H04L 63/166 |

OTHER PUBLICATIONS

Machavity. "DNS over TLS / Dot as a Private Service (Authentication) Possible?" Server Fault, Aug. 20, 2019, serverfault.com/questions/980043/dns-over-tls-dot-as-a-private-service-authentication-possible. (Year: 2019).*

* cited by examiner

MANAGING CLIENT-ORIENTED DOMAIN NAME SERVICE OVER HYPERTEXT TRANSFER PROTOCOL SECURE

BACKGROUND

A key function of the Domain Name Service (DNS) is to map a resource locator, which is typically a human-readable name, to Internet Protocol (IP) addresses. A computing device sends a DNS request (or query) to a DNS server, which returns a result including a resolution of the IP address of the queried resource. DNS queries are typically sent using a protocol such as User Datagram Protocol (UDP) or Transfer Control Protocol (TCP) in the clear, which enables another party to observe the content of DNS queries.

One solution to the privacy and security problems of DNS is DNS over Hypertext Transfer Protocol Secure (DoH), such as that defined in Internet Engineering Task Force (IETF) RFC 8484. DoH provides a protocol for sending DNS queries and responses over the HTTP Secure protocol using the Transport Layer Security (TLS) protocol. However, DoH also bypasses or renders non-functional DNS-based policies and services that rely on such DNS-based policies.

SUMMARY

Various aspects disclosed herein include methods that may be implemented on a processor of a network computing device for managing Domain Name Service (DNS) over Hypertext Transfer Protocol Secure (DoH). Various aspects may include receiving from a client computing device a DoH request comprising a public certificate associated with a client identifier, generating a fingerprint of the public certificate, obtaining a client-specific DoH policy based on an association between the fingerprint of the public certificate and the client-specific DoH policy, and applying the DoH policy to the DoH request to formulate a response to the DoH request.

Some aspects may include receiving from the client computing device policy parameters, and configuring the client-specific DoH policy based on the received policy parameters, wherein obtaining the client-specific DoH policy based on the association between the fingerprint of the public certificate and the client-specific DoH policy includes obtaining the client-specific DoH policy that is configured based on the received policy parameters. In some aspects, configuring the client-specific DoH policy based on the received policy parameters may include receiving from the client computing device the public certificate associated with the client identifier, generating a fingerprint of the public certificate, generating the association between the fingerprint of the public certificate and the client-specific DoH policy, and storing in a data structure the association between the fingerprint of the public certificate and the client-specific DoH policy.

In some aspects, applying the DoH policy to the DoH request to formulate a response to the DoH request may include applying the DoH policy to the DoH request to perform a DNS-based advertisement management operation, and formulating the response to the DoH request using an output of the DNS-based advertisement management operation. In some aspects, applying the DoH policy to the DoH request to formulate a response to the DoH request may include applying the DoH policy to the DoH request to perform a DNS-based parental control operation, and formulating the response to the DoH request using an output of the DNS-based parental control operation. In some aspects, applying the DoH policy to the DoH request to formulate a response to the DoH request may include applying the DoH policy to the DoH request to perform a DNS-based content filtering operation, and formulating the response to the DoH request using an output of the DNS-based content filtering operation.

Various aspects further include a network computing device having a processor configured with processor executable instructions to perform operations of any of the methods summarized above. Various aspects further include a network processing device for use in a computing device and configured to perform operations of any of the methods summarized above. Various aspects include a network computing device having means for performing functions of any of the methods summarized above. Various aspects include a non-transitory processor-readable storage medium having stored thereon processor-executable instructions configured to cause a processor of a network computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
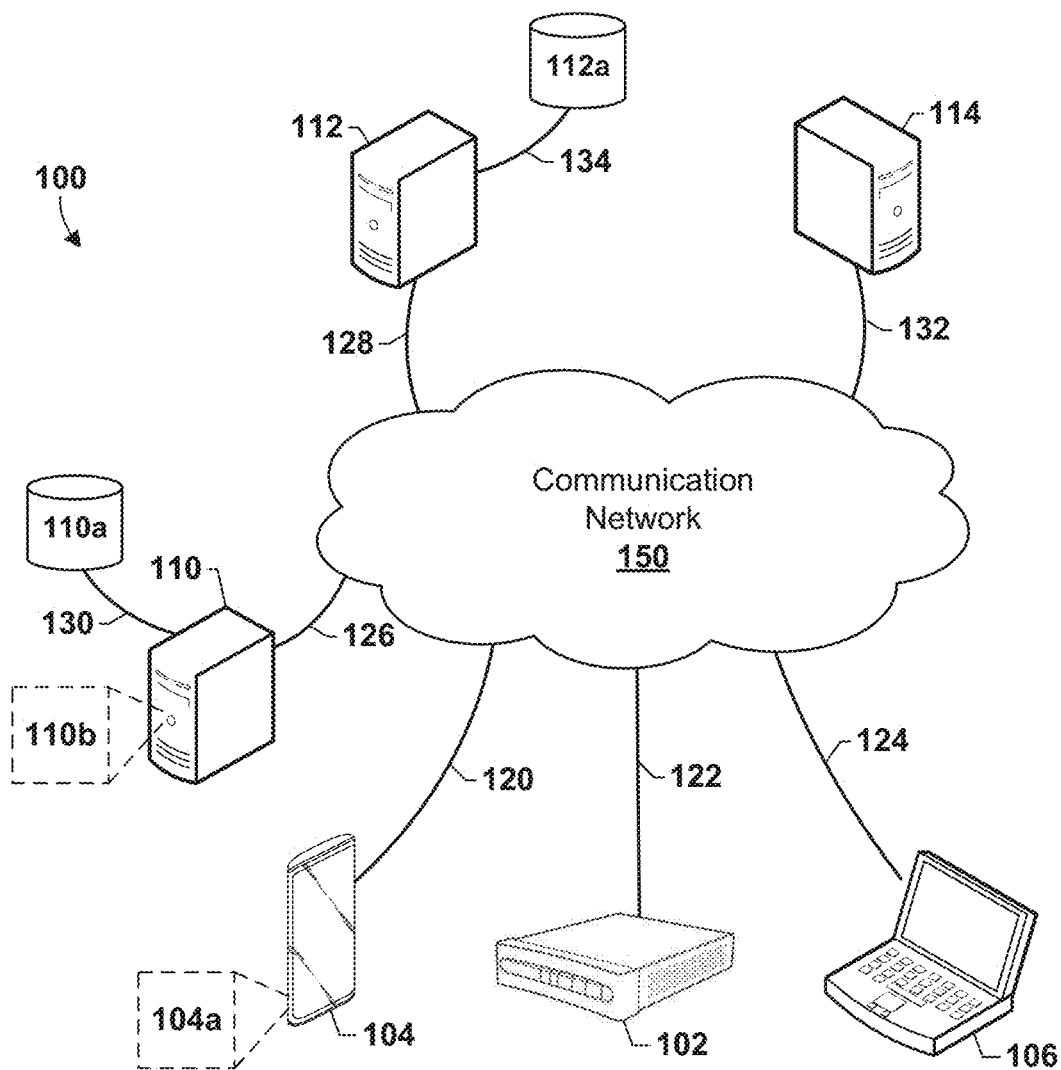
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

DNS queries are typically sent in unencrypted plaintext (e.g., in the clear), which enables another party to observe the content of DNS queries. DoH provides a protocol for sending DNS queries and responses using HTTPS, which enables the transport of DNS queries and responses via an encrypted communication channel. However, DoH also bypasses or renders non-functional DNS-based policies and services that rely on such DNS-based policies. For example, DoH may bypass DNS-based parental controls. DNS-based parental controls rely on a DNS query including plaintext, which allows an intermediate device to view the domain requested in the DNS query, determine that the requested domain is subject to parental control blocking, and replace the response IP address with a "blocked" response (e.g., a blocked IP address). Since DoH transports DNS queries and responses via an encrypted communication channel, DoH disables DNS services that involve the inspection and alteration of DNS requests or responses, including lists permitting or blocking certain IP addresses, DNS ad blocking, and cross-site tracking.

Various embodiments enable a network computing device to perform operations for DoH that enable the application of DNS-based policies to DNS queries and/or responses and provide communication security for DNS queries and/or responses. Various embodiments enable the management of client-specific DNS-based policies in a DoH system. As used herein, the term "client-specific" means per-client computing device, per-user computing device, or per-account (which may include one or more computing devices). As used herein, the term "client-specific policy" means an information management process, procedure, or technique as applied in a technological and client-specific manner. The terms "client-specific" and "client-specific policy" refer to technological entities and processes, and not to means of organizing human activity or other non-technological interpretations of those terms.

Various embodiments may enable a network computing device to be configured to apply DNS policies and provide DNS features on a client-specific basis. In some embodiments, a client computing device may receive an input (e.g., from an end user) to configure DNS preferences via a local or network-based application. In some embodiments, a network operator or network access provider may use the DNS preferences to configure and/or apply DNS policies or DNS features to one or more client computing devices (such as on an account basis, an individual basis, and/or the like). In some embodiments, a network operator or network access provider may configure a client computing device to refer DNS requests to a network computing device that enables such network operator or access provider to manage DNS requests over HTTPS (i.e., DoH), and to apply a feature set on a client-specific basis.

In some embodiments, the network computing device may be configured to perform a configuration process for a client device or client account. In some embodiments, as part of the configuration process, the network computing device may receive from the client computing device a public key certificate (a public certificate) associated with a client identifier (e.g., a unique identifier that identifies a client computing device or client account). The network computing device may generate a fingerprint of the public certificate, and may generate the association between the fingerprint of the public certificate and the client-specific DoH policy.

The network computing device may store in a data structure (such as a database or another suitable data structure) the association between the fingerprint of the public certificate and the client-specific DoH policy. In some embodiments, the network computing device may store the client-specific DoH policy in or with the data structure, or in another member location or memory device. In some embodiments, the network computing device may configure the client computing device (e.g., by providing configuration settings to the client computing device) to send DoH requests to the network computing device, which enables the network computing device to apply one or more feature sets and/or DNS policies to DoH requests from the client computing device.

As noted above, various embodiments enable the network computing device to configure and apply a DoH policy on a client-specific basis. In some embodiments, the network computing device may receive from the client computing device policy parameters. The network computing device may configure the client-specific DoH policy based on the received policy parameters. In such embodiments, for example, following the receipt of a DoH request from a client computing device, the network computing device may obtain the client-specific DoH policy that is configured based on the received policy parameters.

In some embodiments, a network computing device may receive from the client computing device a DoH request including the public certificate that is associated with the client identifier. A DoH request includes a DNS request that is transported using the DoH protocol. The network computing device may generate a fingerprint of the public certificate received with the DoH request. The network computing device may obtain (e.g., from a memory accessible by the network computing device) the client-specific DoH policy based on an association between the fingerprint of the public certificate and the client-specific DoH policy.

The network computing device may apply the client-specific DoH policy to the DoH request to formulate a response to the DoH request. In some embodiments, the network computing device may apply the DoH policy to the DoH request to perform a DNS-based advertisement management operation. In such embodiments, the network computing device may formulate the response to the DoH request using an output of the DNS-based advertisement management operation. In some embodiments, the network computing device may apply the DoH policy to the DoH request to perform a DNS-based parental control operation. In such embodiments, the network computing device may formulate the response to the DoH request using an output of the DNS-based parental control operation. In some embodiments, the network computing device may apply the DoH policy to the DoH request to perform a DNS-based content filtering operation. In such embodiments, the network computing device may formulate the response to the DoH request using an output of the DNS-based content filtering operation.

Various embodiments improve the operation of a network computing system and a communication network by enabling the network computing device to maintain and apply client-specific DNS policies in a system employing DoH. Various embodiments improve the operation of a network computing system and a client computing device by enabling the network computing device to provide client-specific services in a system employing DoH. Various embodiments improve the operation of a network computing system and a client computing device by enabling the network computing device to apply DNS-based policies in a system employing DoH.

Various embodiments may be implemented within a variety of communication systems 100, an example of which is illustrated in FIG. 1. With reference to FIG. 1, the communication system 100 may include various user equipment (UE) such as a set top box (STB) 102, a mobile device 104, a computer 106. In addition, the communication system 100 may include network elements such as network computing devices 110, 112, and 114, and a communication network 150. The STB 102, the mobile device 104, the computer 106, and the network computing devices 110, 112, and 114 may communicate with the communication network 150 via a respective wired or wireless communication link 120, 122, 124, 126, 128 and 132. The network computing device 110 may communicate with a data store 110a via a wired or wireless communication link 130. The network computing device 112 may communicate with a data store 112a via a wired or wireless communication link 134.

The STB 102 may include customer premises equipment, which may be implemented as a set top box, a router, a modem, or another suitable device configured to provide functions of an STB. The mobile device 104 may include any of a variety of portable computing platforms and communication platforms, such as cell phones, smart phones, Internet access devices, and the like. The computer 106 may include any of a variety of personal computers, desktop computers, laptop computers, and the like. The STB 102, the mobile device 104, and the computer 106 may each include a processor or processing device that may execute one or more client applications (e.g., client application 104a). The client application 104a may be configured to send a DoH request and to receive send a DoH response.

The network computing devices 110 and 112 may be configured to perform operations related to management of DoH. In some embodiments, the network computing device 110 may be configured to perform operations as a DoH edge server. In some embodiments, the computing device 110 may be part of an edge of the communication network 150, which may be physically located relatively proximate to one or more of the STB 102, the mobile device 104, and the computer 106. In some embodiments, the network computing device 112 may be configured to perform operations as a DoH policy server. In some embodiments, the computing device 112 may manage and/or provide one or more DoH policies to the network computing device 110, such as for use in operations related to providing one or more DNS services for the STB 102, the mobile device 104, or the computer 106. In some embodiments, execution of a task or service may require data or information stored in the data store 110a and/or 112a. In some embodiments, the functions of the computing devices 110 and 112 may be combined in a single network computing device. In some embodiments, the functions of the network computing devices 110 and 112 may be separated into a plurality of network computing devices.

The network computing device 114 may be configured to function, for example, as an application server or web server, to provide one or more resources, services, information, and the like. In some embodiments, a resource, service, or information provided by the network computing device 114 may be the subject of a DoH request sent by one of the STB 102, the mobile device 104, and the computer 106 to the network computing device 110.

The communication network 150 may support wired and/or wireless communication among the STB 102, the mobile device 104, the computer 106, and the computing devices 110, 112, and 114. The communication network 150 may include one or more additional network elements, such as servers and other similar devices (not illustrated). The communication system 100 may include additional network elements to facilitate communication among the STB 102, the mobile device 104, the computer 106, and the computing devices 110, 112, and 114. The communication links 120, 122, 124, 126, 128, 130, 132, and 134 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 120, 122, 124, 126, 128, 130, 132, and 134 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, 126, 128, 130, 132, and 134 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
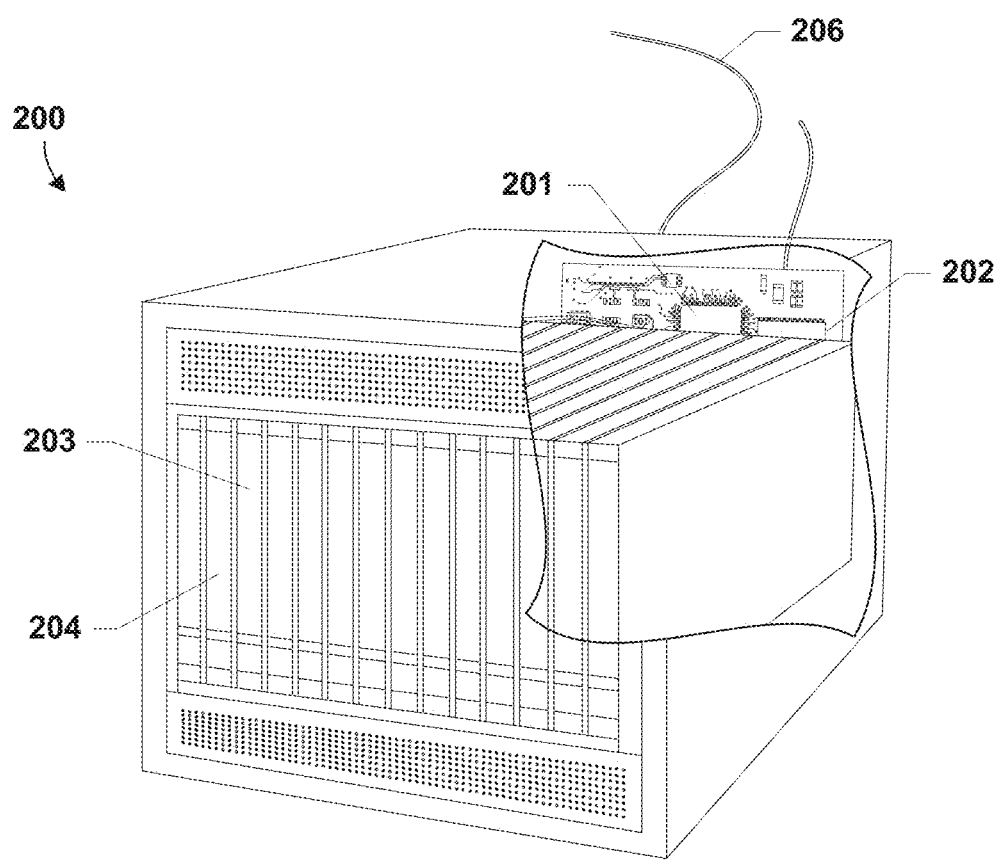
FIG. 2 is a component block diagram illustrating components of a network element suitable for implementing various embodiments.

Various embodiments may use a network computing device as a server, router, or another suitable element of a communication network. Such network elements may typically include at least the components illustrated in FIG. 2, which illustrates an example network computing device 200. With reference to FIGS. 1 and 2, the network computing device 200 (e.g., the network computing devices 110, 112, and 114) may include a processor 201 coupled to volatile memory 202 and a large capacity nonvolatile memory, such as a disk drive 203. The network computing device 200 may also include a peripheral memory access device such as a floppy disc drive, compact disc (CD) or digital video disc (DVD) drive 204 coupled to the processor 201. The network computing device 200 may also include network access ports 206 (or interfaces) coupled to the processor 201 for establishing data connections with a network, such as the Internet and/or a local area network coupled to other system computers and servers. Similarly, the network computing device 200 may include additional access ports, such as USB, Firewire, Thunderbolt, and the like for coupling to peripherals, external memory, or other devices.

Figure 3:
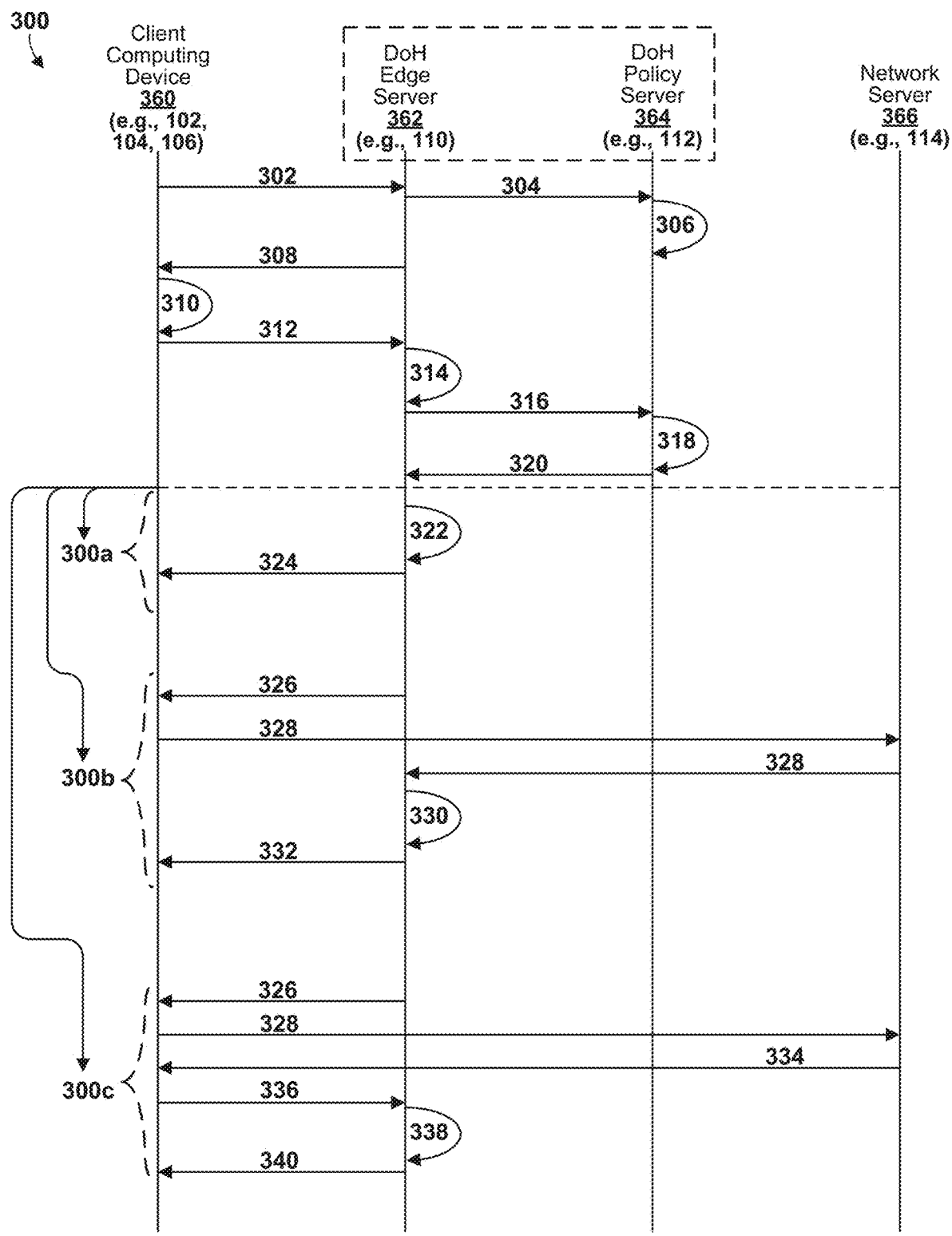
FIG. 3 is a message flow diagram illustrating a method 300 for managing DOH according to various embodiments.

FIG. 3 is a message flow diagram illustrating a method 300 for managing DOH according to various embodiments. FIG. 3 illustrates a client computing device 360 (e.g., the STB 102, the mobile device 104, and the computer 106), a DoH edge server 362 (e.g., the network computing device 110), a DoH policy server 364 (e.g., the network computing device 112), and a network server 366 (e.g., the network computing device 114). For conciseness, the DoH edge server 362 and the DoH policy server 364 are illustrated as separate entities, but this is not intended to limit the scope or functions described to two network entities. As noted above, the functions of the DoH edge server 362 and the DoH policy server 364 may be combined in a single network computing device or distributed among a plurality of network computing devices, as signified by a dashed box.

With reference to FIGS. 1-3, in various embodiments, the client computing device 360 may send to the DoH edge server 362 a message 302 that may include parameters for configuring a client-specific DoH policy ("policy parameters") related to the client computing device. The message 302 also may include a client identifier. In some embodiments, the policy parameters may pertain to a specific client computing device or a group of client computing devices, including one, some, or all computing devices that may be managed under a client account (which may be associated with or identifiable using the client identifier). In some embodiments, the message 302 also may include a public certificate that is associated with the client identifier.

The DoH edge server 362 may receive the message 302, and may send a message 304 to the DoH policy server 364. The message 304 may include the client identifier, the policy parameters, and or the public certificate associated with the client identifier. In some embodiments, the DoH policy server 364 may perform operations 306. In some embodiments, the DoH policy server 364 may configure the client-specific DoH policy based on the received policy parameters. For example, the DoH policy server 364 may configure the client-specific DoH policy with parameters that enable the performance of a DNS-based advertisement management operation. As another example, the DoH policy server 364 may configure the client-specific DoH policy with parameters that enable the performance of a DNS-based parental control operation. As another example, the DoH policy server 364 may configure the client-specific DoH policy with parameters that enable the performance of a DNS-based content filtering operation.

In some embodiments, the DoH edge server 362 may send to the client computing device 360 a message 308 that includes DNS configuration information for the client computing device. In some embodiments, such DNS configuration information that may enable the client computing device 360 to be configured to direct a DoH request to the DoH edge server 362. The client computing device 360 may perform configuration operations 310 to store and/or implement the DNS configuration information.

At a later time, the client computing device 360 may send a DoH request 312 to the DoH edge server 362 (e.g., in accordance with the DNS configuration implemented in the client computing device 360). In various embodiments, the DoH request 312 is transported from the client computing device 360 to the DoH edge server 362 via an encrypted communication channel (e.g., using HTTPS). In some embodiments, the DoH request 312 may include a public certificate associated with a client identifier. In some embodiments, the DoH edge server 362 may generate 314 a fingerprint of the public certificate. In some embodiments, the fingerprint may include a unique digital pattern generated using a fingerprint-generating algorithm, and may include. for example, a digital fingerprint, a message digest, a checksum, a hash, or another unique digital pattern suitable for identifying the public certificate.

In some embodiments, the DoH edge server 362 may send a request message 316 to the DoH policy server 364. The request message 316 may include the fingerprint of the public certificate. The DoH policy server 364 may perform an operation 318 related to the client-specific DoH policy. In some embodiments, the DoH policy server 364 may obtain the client-specific DoH policy based on an association between the fingerprint of the public certificate and the client-specific DoH policy. In some embodiments, the DoH policy server 364 may obtain the client-specific DoH policy from a memory (e.g., 112a). In some embodiments, the DoH policy server 364 may apply the client-specific DoH policy to the DoH request 312.

The DoH policy server 364 may send a response message 320 to the DoH edge server 362. In some embodiments, the response message 320 may include the client-specific DoH policy. In some embodiments, the DoH edge server 362 may store the client-specific DoH policy (e.g., in a memory, such as 110a, which may include a cache memory), for example, for a period of time. In some embodiments, the response message 320 may include the result of the DoH policy server 364 applying the client-specific DoH policy to the DoH request 312.

In various embodiments, having received the client-specific DoH policy (or the result of the DoH policy server 364 applying the client-specific DoH policy to the DoH request), the DoH edge server 362 may perform various operations in different scenarios, indicated as scenarios 300a and 300b. Since the DoH request 312 is transported via an encrypted communication channel, an intermediate observer is typically unable to intercept and view the content of the DoH request 312. However, because the DoH edge server 362 is on the terminating end of the encrypted communication channel between the client computing device 360 and the DoH edge server 362, the DoH edge server 362 may access the content of the DoH request 312.

In various embodiments, the DoH edge server 362 may process the content of the DoH request 312 and may route the DoH request content (e.g., a DNS request, such as a DNS packet) to a DNS resolver that may provide a resolved IP address. The DoH edge server 362 may withhold information about the client computing device 360, so that neither the DNS resolver nor any intermediate device (such as an eavesdropper) may determine an identity (or other information) about the client computing device 360. In some embodiments, any DoH responses or DNS responses may be sent to the DoH edge server 362 rather than to the client computing device 360. Further, in some embodiments, the DoH edge server 362 may perform an operation related to the requested domain (i.e., the subject of the DoH request), such as applying the DoH policy to the DoH request to formulate a response to the DoH request. In some embodiments, the DoH edge server 362 may use the result of the DoH policy server 364 applying the client-specific DoH policy to the DoH request 312 to formulate a response to the DoH request 312. In some embodiments, the DoH edge server 362 may alter a DoH or DNS response, such as changing a resolved IP address to a response indicating that the requested IP address or domain is blocked (e.g., for a parental control operation). In some embodiments, the DoH edge server 362 may block or drop the DoH response (e.g., for an advertisement management operation). In some embodiments, the DoH edge server 362 may return the requested IP address to the client computing device 360 (e.g., for a valid request). In various embodiments, the client-specific DoH policy may be applied based on a domain name, or based on the IP address provided in response to the DoH request (e.g., provided by a DNS resolver).

Referring to scenario 300a, in some embodiments, the DoH edge server 362 may perform operations 322 based on the DoH request 312 without passing on or sending a request for information or services to a network server (e.g., 114). For example, the DoH edge server 362 may apply the DoH policy to the DoH request 312 to perform a DNS-based parental control operation. For example, the DoH request may include a request for information or services from a website, domain, or resource location that is blocked based on the DoH policy. As another example, the DoH edge server 362 may apply the DoH policy to the DoH request 312 to perform a DNS-based content filtering operation.

For example, the DoH request 312 may include a request for content from a website, domain, or resource location, or of a type, genre, nature, etc. that is blocked based on the DoH policy. In some embodiments, based on an output of the DNS-based operation(s) 322, the DoH edge server 362 may formulate a response to the DoH request 312. The DoH edge server 362 may send the response to the DoH request 312 in a response message 324. In some embodiments, the DoH edge server 362 may replace an IP address for the requested (and not permitted, or blocked according to the DoH policy) website, domain, or resource location with a different (i.e., second, replacement) IP address for a different website, domain, or resource location. For example, the second IP address may point to a server that hosts a web page that presents a notice such as "Content Blocked due to User Policy" or the like.

Referring to scenario 300b, in some embodiments, the DoH edge server 362 may perform operations 338 based on the DoH request in response to receiving a secondary request for information (such as a secondary DoH request) from the client computing device 360. In some embodiments, the secondary request may include a request that is triggered by, or instructed by, information received in response to a prior or earlier DoH request.

For example, as described above, the DoH edge server 362 may send to the client computing device 360 a DNS response 326 that includes information responsive to the DoH request 312, such as an IP address for the network server 366. Using information in the DoH response 326, the client computing device 360 may send a DoH request 328 to the network server 366 for information or services. The client computing device 360 may receive from the network server 366 a message 330 including information or data related to a service. Then, the client computing device 360 may send, and the DoH edge server 362 may receive from the client computing device 360, a DoH request 332 for additional information. For example, the request 332 may include a request for a website, domain, or resource location that provides advertising content, such as a network advertisement server or another such content provider. As another example, the request 332 may include malicious behavior triggered by information in the message 330. Such malicious behavior may include a download request to download malicious software send to a known or suspected (from its IP address or range of IP addresses) to be a malicious actor source of such software. The message 332 may include information exfiltrated from the client computing device 360 according to a malicious instruction passed along from the network server in the message 332 and sent to a network device known or suspected from its IP address or range of IP addresses to be a malicious actor.

In some embodiments, the DoH edge server 362 may perform operations 334 responsive to the (secondary) DoH request 332. In some embodiments, the DoH edge server 362 may apply the DoH policy to the DoH request 336 to perform a DNS-based advertisement management operation, parental control operation, and/or content filtering operation. In some embodiments, based on an output of the DNS-based operation(s) 334, the DoH edge server 362 may formulate a response to the DoH request. The DoH edge server 362 may send the response to the DoH request in a response message 342.

For example, the response message 340 may include an indication that the website, domain, or resource location requested in the DoH request is not permitted (e.g., according to the DoH policy). In some embodiments, the DoH edge server 362 may not provide an indication to the client computing device of the output of the operations 340 (i.e., the DoH edge server 362 may apply the DoH policy to the DoH request 336 without notifying the client computing device 360). For example, the DoH edge server 362 may drop or discard the DoH request 332. In such embodiments, the message 340 is optional. In some embodiments, the DoH edge server 362 may replace an IP address for the requested (and not permitted, or blocked according to the DoH policy) website, domain, or resource location with a different (i.e., second, replacement) IP address for a different website, domain, or resource location. For example, the second IP address may point to a server that hosts a web page that presents a notice such as "Advertisement Blocked due to User Policy," "Malicious Activity Blocked due to User Policy," and/or the like.

Figure 4:
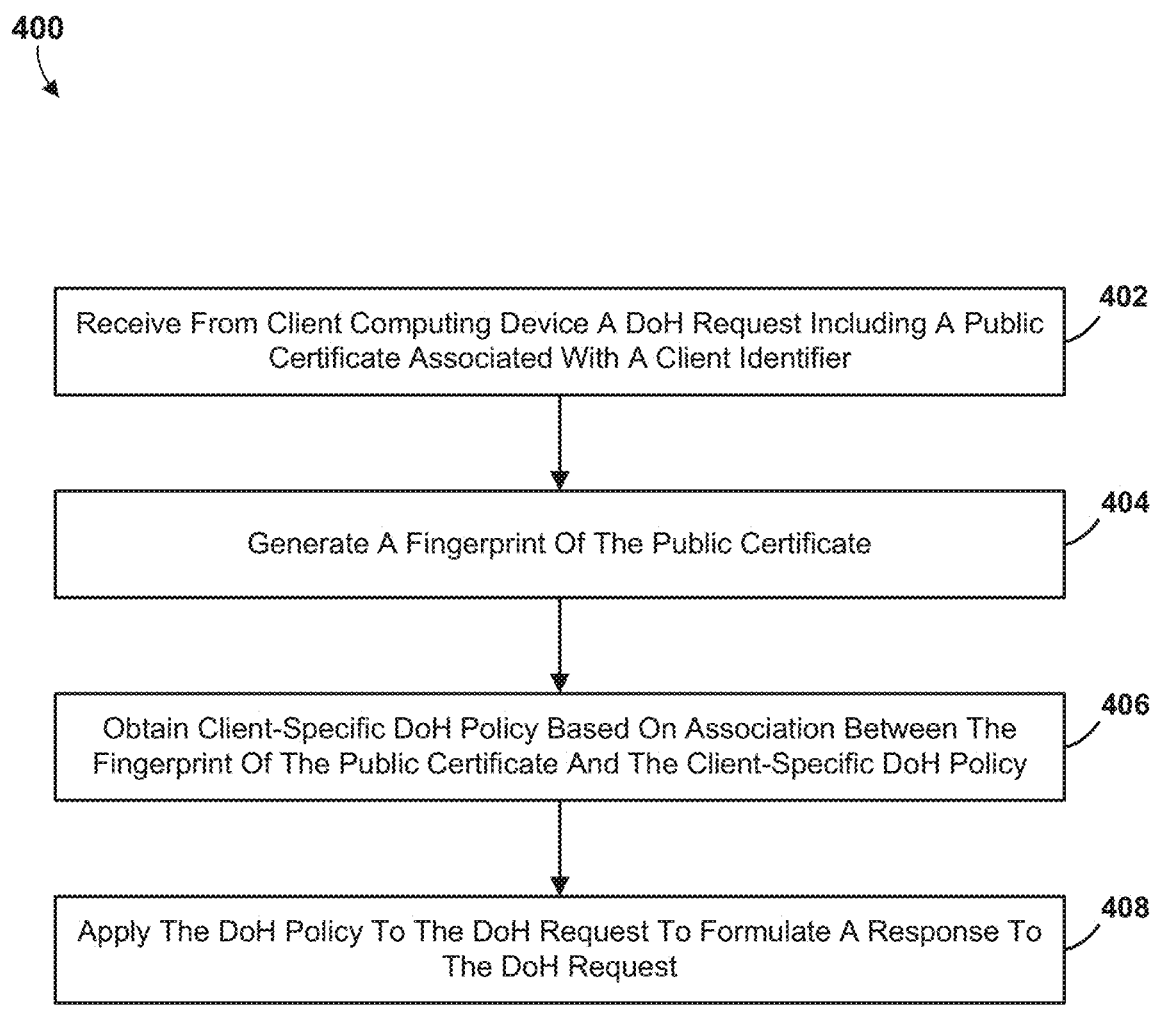
FIG. 4 is a process flow diagram illustrating a method 400 for managing DoH according to various embodiments.

FIG. 4 is a process flow diagram illustrating a method 400 for managing DoH according to various embodiments. With reference to FIGS. 1-4, the operations of the method 400 may be implemented in hardware components and/or software components of a network computing device (e.g., the network computing device 110, 112, 200) the operation of which may be controlled by one or more processors (e.g., the processor 201 and/or the like), referred to herein as a "processor".

In block 402, the processor may receive from a client computing device (e.g., 102, 104, 106, 360) a DoH request comprising a public certificate associated with a client identifier. In some embodiments, the DoH request may be directed to a domain configured to receive client-specific DoH requests (e.g., www.charter.dns.client123.com). In some embodiments, the DoH request may include a request configured to include an application programming interface (API) request. Other examples for configuring the DoH request are also possible.

In block 404, the processor may generate a fingerprint of the public certificate. In some embodiments, the fingerprint may include a unique digital pattern generated using a fingerprint-generating algorithm, and may include. for example, a digital fingerprint, a message digest, a checksum, a hash, or another unique digital pattern suitable for identifying the public certificate.

In block 406, the processor may obtain a client-specific DoH policy based on an association between the fingerprint of the public certificate and the client-specific DoH policy. For example, the processor may obtain the client-specific DoH policy from a network computing device (e.g., the DoH policy server 364), or from a memory (e.g., 110a), or from another suitable device or memory location.

In block 408, the processor may apply the DoH policy to the DoH request to formulate a response to the DoH request. In some embodiments, the processor may determine an IP address or IP address range of a requested website, domain, resource location, or another suitable subject of the DoH request. The processor may determine whether the IP address or IP address range corresponds to a permitted or blocked IP address or IP address range in the DoH policy. The processor may formulate a response to the DoH request based on whether the IP address or IP address range corresponds to a permitted or blocked IP address or IP address range in the DoH policy. In some embodiments, the processor may apply the DoH policy to the DoH request to perform one or more DNS-based operation, such as an advertisement management operation, a parental control operation, a content filtering operation, and/or the like.

Figure 5A:
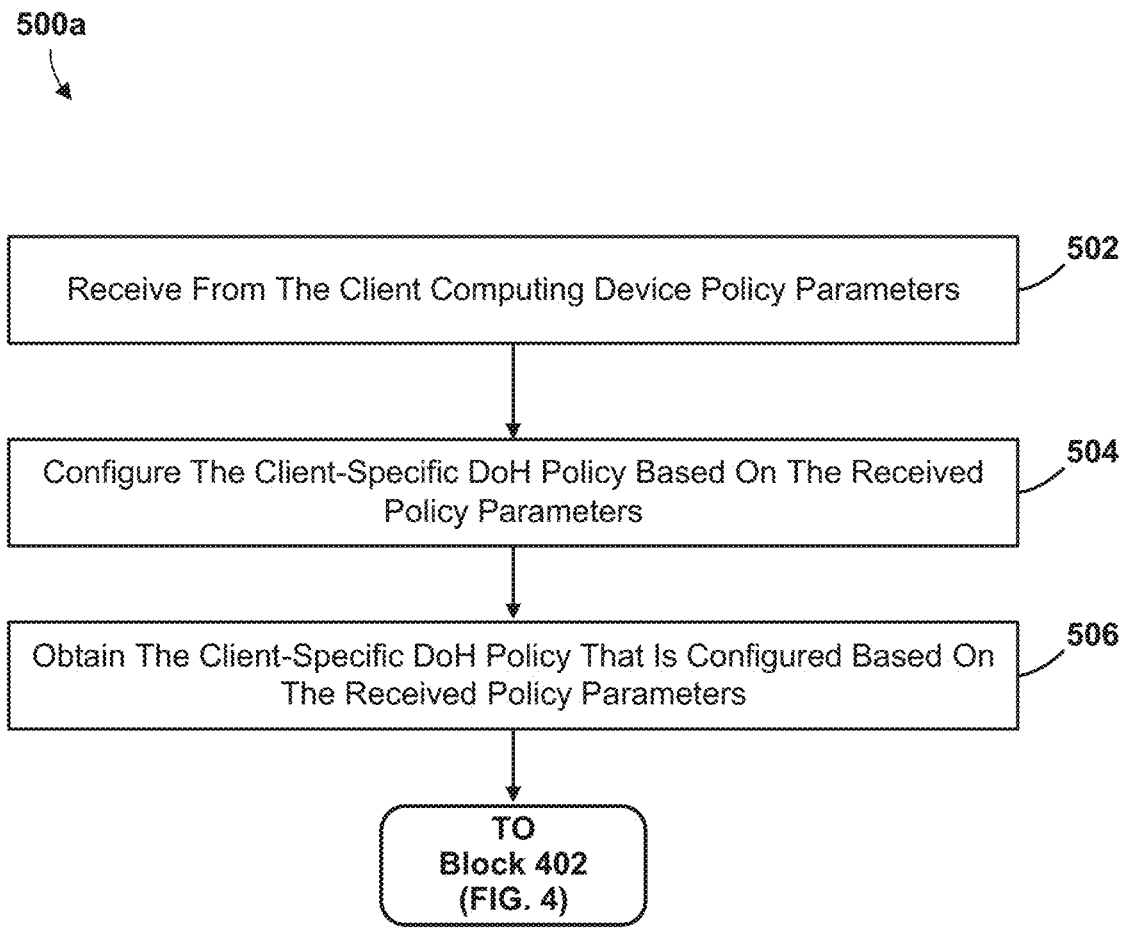
FIGS. 5A and 5B illustrate process flow diagrams of operations 500a and 500b that may be performed as part of the method 400 of managing DoH according to various embodiments.
Figure 5B:
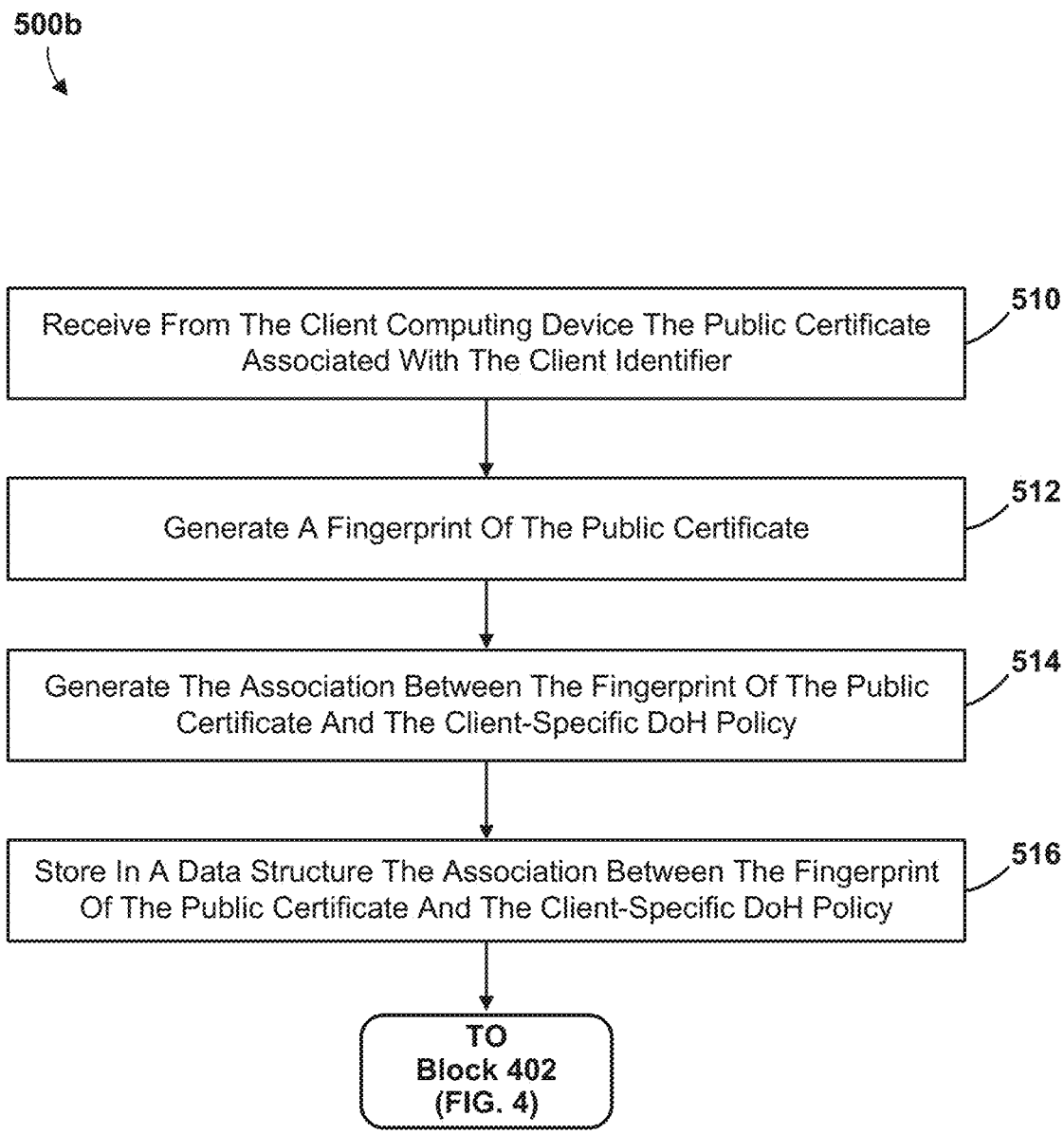

FIGS. 5A and 5B illustrate process flow diagrams of operations 500a and 500b that may be performed as part of the method 400 of managing DoH according to various embodiments. With reference to FIGS. 1-5B, the operations 500a and 500b may be implemented in hardware components and/or software components of a computing device (e.g., the computing device 110) the operation of which may be controlled by one or more processors (e.g., the processor 201 and/or the like).

With reference to FIG. 5A, the processor may receive from the client computing device policy parameters in block 502. For example, the processor may receive a message (e.g., 302) from the client computing device (e.g., 360) that may include policy parameters for configuring a client-specific DoH policy related to the client computing device.

In block 504, the processor may configure the client-specific DoH policy based on the received policy parameters.

In block 506, the processor may obtain the client-specific DoH policy that is configured based on the received policy parameters. In this manner, the processor may configure (and store) a client-specific DoH policy that includes user parameters input to the client computing device and provided to the processor.

The processor may perform the operations of block 402 (FIG. 4) as described.

With reference to FIG. 5B, the processor may, as part of a configuration process receive from the client computing device the public certificate associated with the client identifier in block 510. For example, the processor may receive from the client computing device (e.g., 360) a public certificate associated with a unique identifier that identifies a client computing device or client account.

In block 512, the processor may generate a fingerprint of the public certificate. Various techniques for generating a fingerprint are described above.

In block 514, the processor may generate the association between the fingerprint of the public certificate and the client-specific DoH policy.

In block 516, the processor may store in a data structure the association between the fingerprint of the public certificate and the client-specific DoH policy. In some embodiments, the processor may store the data structure in a memory (e.g., 110a). In some embodiments, the processor may send the data structure to another network computing device (e.g., the DoH policy server 112, 364) for storage (e.g., in the memory 112a).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations methods and operations 400, 500a, and 500b may be substituted for or combined with one or more operations of the methods 400, 500a, and 500b and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a network computing device for managing Domain Name Service (DNS) over Hypertext Transfer Protocol Secure (DoH), comprising:
   receiving from a client computing device a DoH request comprising a public certificate associated with a client identifier and DoH request content;
   generating a fingerprint of the public certificate;
   obtaining a client-specific DoH policy based on an association between the fingerprint of the public certificate and the client-specific DoH policy;
   routing the DoH request content to a DNS resolver, wherein the DoH request does not contain any identifying information regarding the client computing device;
   receiving a DNS response from the DNS resolver; and
   applying the client-specific DoH policy to the DoH request to formulate a response to the DoH request based upon the DNS response.

2. The method of claim 1, further comprising:
   receiving from the client computing device policy parameters; and
   configuring the client-specific DoH policy based on the received policy parameters;
   wherein obtaining the client-specific DoH policy based on the association between the fingerprint of the public certificate and the client-specific DoH policy comprises obtaining the client-specific DoH policy that is configured based on the received policy parameters.

3. The method of claim 2, wherein configuring the client-specific DoH policy based on the received policy parameters comprises:
   generating the association between the fingerprint of the public certificate and the client-specific DoH policy; and
   storing in a data structure the association between the fingerprint of the public certificate and the client-specific DoH policy.

4. The method of claim 1, wherein applying the client-specific DoH policy to the DoH request to formulate a response to the DoH request comprises:
   applying the client-specific DoH policy to the DoH request to perform a DNS-based advertisement management operation; and
   formulating the response to the DoH request using an output of the DNS-based advertisement management operation.

5. The method of claim 1, wherein applying the client-specific DoH policy to the DoH request to formulate a response to the DoH request comprises:
   applying the client-specific DoH policy to the DoH request to perform a DNS-based parental control operation; and
   formulating the response to the DoH request using an output of the DNS-based parental control operation.

6. The method of claim 1, wherein applying the client-specific DoH policy to the DoH request to formulate a response to the DoH request comprises:
   applying the client-specific DoH policy to the DoH request to perform a DNS-based content filtering operation; and
   formulating the response to the DoH request using an output of the DNS-based content filtering operation.

7. A network computing device, comprising:
   a processor coupled to the memory and configured with processor-executable instructions to perform operations comprising:

receiving from a client computing device a Domain Name Service (DNS) over Hypertext Transfer Protocol Secure (DoH) request comprising a public certificate associated with a client identifier and DoH request content;

generating a fingerprint of the public certificate;

obtaining a client-specific DoH policy based on an association between the fingerprint of the public certificate and the client-specific DoH policy;

routing the DoH request content to a DNS resolver, wherein the DoH request does not contain any identifying information regarding the client computing device;

receiving a DNS response from the DNS resolver; and applying the client-specific DoH policy to the DoH request to formulate a response to the DoH request based upon the DNS response.

8. The network computing device of claim 7, wherein the processor is configured with processor-executable instructions to perform operations further comprising:

receiving from the client computing device policy parameters; and configuring the client-specific DoH policy based on the received policy parameters;

wherein obtaining the client-specific DoH policy based on the association between the fingerprint of the public certificate and the client-specific DoH policy comprises obtaining the client-specific DoH policy that is configured based on the received policy parameters.

9. The network computing device of claim 8, wherein the processor is configured with processor-executable instructions to perform operations such that configuring the client-specific DoH policy based on the received policy parameters comprises:

generating the association between the fingerprint of the public certificate and the client-specific DoH policy; and storing in a data structure the association between the fingerprint of the public certificate and the client-specific DoH policy.

10. The network computing device of claim 7, wherein the processor is configured with processor-executable instructions to perform operations such that applying the client-specific DoH policy to the DoH request to formulate a response to the DoH request comprises:

applying the client-specific DoH policy to the DoH request to perform a DNS-based advertisement management operation; and formulating the response to the DoH request using an output of the DNS-based advertisement management operation.

11. The network computing device of claim 7, wherein the processor is configured with processor-executable instructions to perform operations such that applying the client-specific DoH policy to the DoH request to formulate a response to the DoH request comprises:

applying the client-specific DoH policy to the DoH request to perform a DNS-based parental control operation; and formulating the response to the DoH request using an output of the DNS-based parental control operation.

12. The network computing device of claim 7, wherein the processor is configured with processor-executable instructions to perform operations such that applying the client-specific DoH policy to the DoH request to formulate a response to the DoH request comprises:

applying the client-specific DoH policy to the DoH request to perform a DNS-based content filtering operation; and formulating the response to the DoH request using an output of the DNS-based content filtering operation.

13. A non-transitory processor-readable medium having stored thereon processor-executable instruction configured to cause a processor of a network computing device to perform operations comprising:

receiving from a client computing device a Domain Name Service (DNS) over Hypertext Transfer Protocol Secure (DoH) request comprising a public certificate associated with a client identifier and DoH request content;

generating a fingerprint of the public certificate;

obtaining a client-specific DoH policy based on an association between the fingerprint of the public certificate and the client-specific DoH policy;

routing the DoH request content to a DNS resolver, wherein the DoH request does not contain any identifying information regarding the client computing device;

receiving a DNS response from the DNS resolver; and applying the client-specific DoH policy to the DoH request to formulate a response to the DoH request based upon the DNS response.

14. The non-transitory processor-readable medium of claim 13, wherein the stored processor-executable instructions are configured to cause a processor of a network computing device to perform operations further comprising:

receiving from the client computing device policy parameters; and configuring the client-specific DoH policy based on the received policy parameters;

wherein obtaining the client-specific DoH policy based on the association between the fingerprint of the public certificate and the client-specific DoH policy comprises obtaining the client-specific DoH policy that is configured based on the received policy parameters.

15. The method of claim 14, wherein the stored processor-executable instructions are configured to cause a processor of a network computing device to perform operations such that configuring the client-specific DoH policy based on the received policy parameters comprises:

generating the association between the fingerprint of the public certificate and the client-specific DoH policy; and storing in a data structure the association between the fingerprint of the public certificate and the client-specific DoH policy.

16. The non-transitory processor-readable medium of claim 13, wherein the stored processor-executable instructions are configured to cause a processor of a network computing device to perform operations such that applying the client-specific DoH policy to the DoH request to formulate a response to the DoH request comprises:

applying the client-specific DoH policy to the DoH request to perform a DNS-based advertisement management operation; and formulating the response to the DoH request using an output of the DNS-based advertisement management operation.

17. The non-transitory processor-readable medium of claim 13, wherein the stored processor-executable instructions are configured to cause a processor of a network computing device to perform operations such that applying the client-specific DoH policy to the DoH request to formulate a response to the DoH request comprises:
applying the client-specific DoH policy to the DoH request to perform a DNS-based parental control operation; and
formulating the response to the DoH request using an output of the DNS-based parental control operation.

18. The non-transitory processor-readable medium of claim 13, wherein the stored processor-executable instructions are configured to cause a processor of a network computing device to perform operations such that applying the client-specific DoH policy to the DoH request to formulate a response to the DoH request comprises:
applying the client-specific DoH policy to the DoH request to perform a DNS-based content filtering operation; and
formulating the response to the DoH request using an output of the DNS-based content filtering operation.

* * * * *